2,801,658

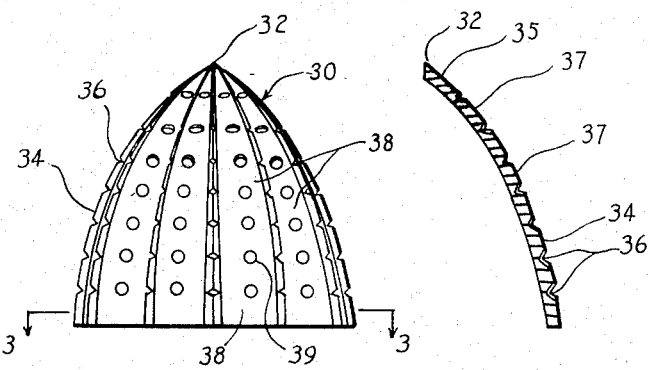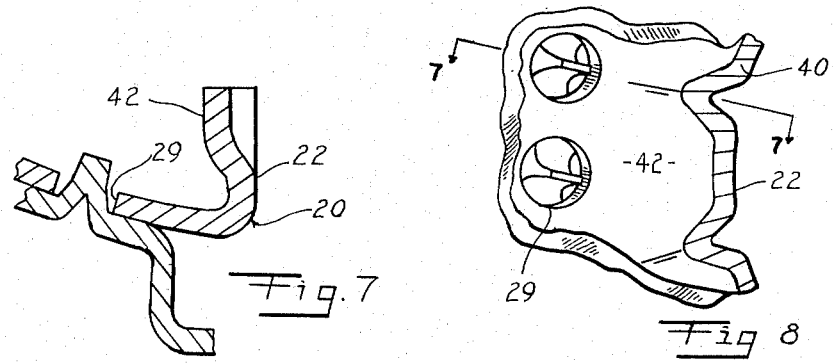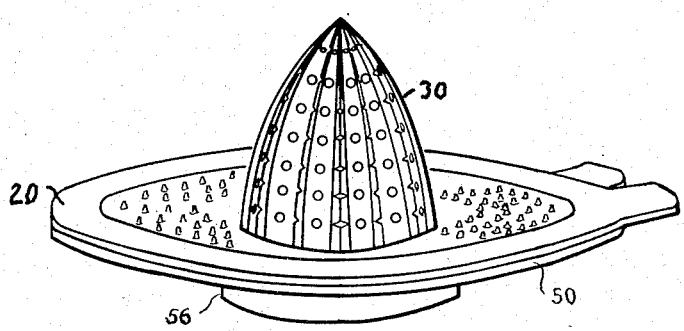

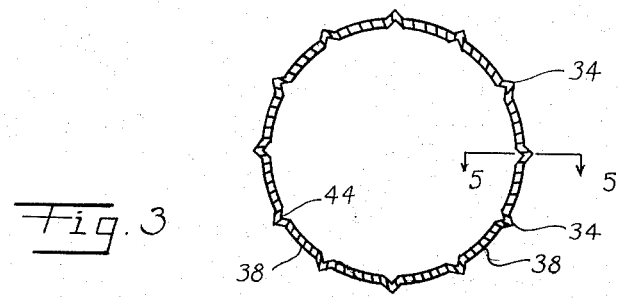
Fig. 3
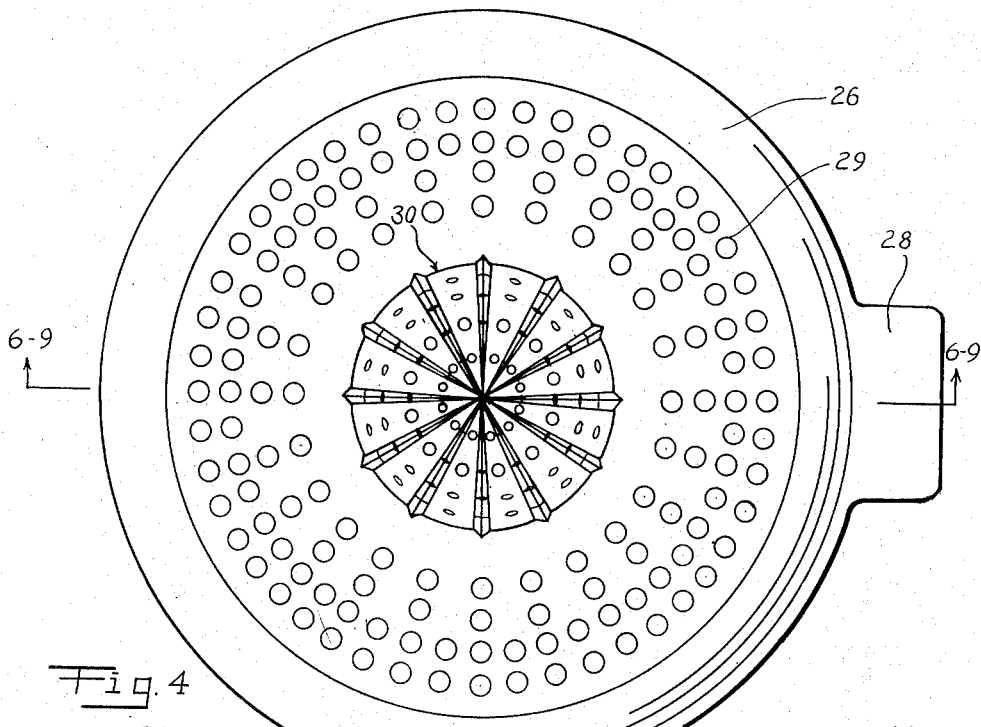
Fig. 4
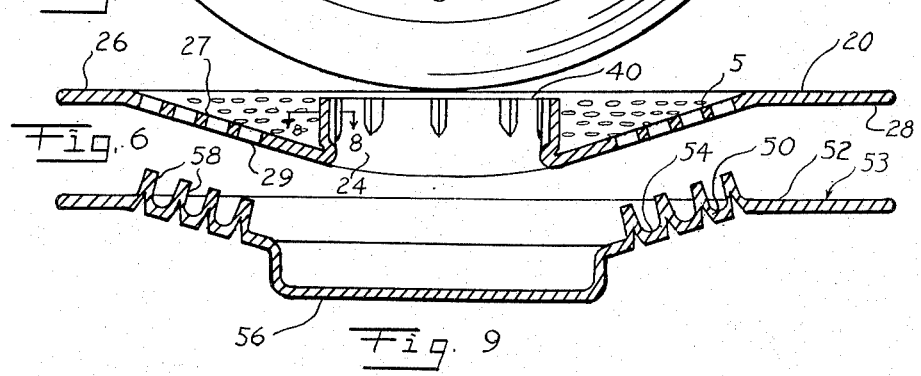
Fig. 6
Fig. 9

COMBINATION JUICER AND GRATER

Stena R. Thomas, Syracuse, N. Y.

Application June 11, 1956, Serial No. 590,523

2 Claims. (Cl. 146—3)

This invention relates to a combination juicer and grater for household use.

The invention is directed to a three part assembly all of which cooperates as a juicer, or grater, the assembly comprising a perforate annular saucer part, which may serve as a juice strainer, or a guard or stripper for matching grating teeth extruded from or otherwise formed as a part of a matching saucer-like grater member. The assembly includes a hollow reamer having perforations in the wall thereof to permit the flow of juice through the reamer. All the parts are readily assembled and disassembled and are readily formed of sheet material or may be cast or molded as desired.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a perspective view of the extractor and grater assembled;

Figure 2 is a side view of the reamer element;

Figure 3 is a transverse sectional view taken substantially on the line 3—3 of Figure 2;

Figure 4 is a top plan view of the perforate saucer and reamer assembled, the grater saucer being hidden therebeneath;

Figure 5 is a sectional view taken through the reamer substantially on the line 5—5 of Figure 3;

Figure 6 is a sectional view taken through the perforate saucer substantially on the line 6—6 of Figure 4;

Figure 7 is an enlarged fragmentary sectional view taken through the perforate saucer collar on the line 7—7 of Figure 8;

Figure 8 is an enlarged fragmentary sectional view taken through the perforate saucer collar on the line 8—8 of Figure 4; and Figure 9 is a sectional view of the grater saucer taken substantially on the line 9—9 of Figure 4.

In the drawings there is shown the three parts of the squeezer and grater. A perforate saucer or saucer shaped annular member 20 having an upstanding substantially circular collar or flange 22, defining a central aperture 24, is provided with a rim flange 26, and a handle like extension 28. The portion between the rim flange 26, and collar 22 is suitably formed concave substantially as shown at 27 and provided with a series of apertures 29. The rim flange 26 will be of a suitable diameter to rest upon the rim of a bowl of convenient diameter.

Adapted to fit over the collar 22 is a hollow reamer 30 of substantially circular transverse cross section, such reamer converging to a point or apex as at 32, and presenting in axial section, a generally curved conical, or Gothic section. The shell-like reamer, is provided with a series of outwardly projecting angular ribs, 34 extending from the bottom of the reamer upwardly substantially the entire height of the reamer shell, the ribs reducing in height as at 35 as the upper ends thereof approach the apex at 32. Such ribs are broken at frequent intervals by sharp indentations 36 to provide intermediate tooth-like sections 37. The indentations may be formed by sharply forcing the metal of the ribs inwardly at spaced points, or by cutting away V notches of metal. The land portions 38 intermediate adjacent ribs 34 are of gore configuration and each are provided with a series of perforations 39 through which juice extracted from fruit pressed and reamed upon the reamer may pass.

The collar 22 of the member 20 is deformed outwardly from its upper edge 40 downwardly for about two-thirds of the collar length to provide keying ridges 42. The number of ridges so formed will correspond to the number or ribs 34 of the reamer, and are similarly angularly spaced. The external diameter of the collar will be such as to closely fit within the lower end of the gore portions 38 of the reamer, while the projections or ridges 42 will key into the internal grooves 44 formed by the reamer ribs 34. The reamer may be readily disassembled and reassembled upon the member 20 for ready cleaning, or for use of the saucer member apart from the reamer for grating purposes.

The member 20, is adapted to cooperate with a saucer grater or saucer shaped member 50 having a marginal rim flange 52, handle 53 and a concave central annular portion 54 having a configuration such that its upper concave surface will fit snugly against the convex upper surface of the member 20. The center portion of the member 50 may have a circular central portion offset downwardly as at 56, to stiffen the member 50, as well as to provide a flat support for the member. Extruded upwardly from the surface of the annular portion are a plurality of grating teeth 58. The number and arrangement of such teeth is such as to correspond precisely to the apertures 29 in the member 20, and such teeth 58 make a relatively close fit in projecting through such apertures 26, when the member 20 is nested upon the member 50. The projections are struck out of or extruded from the member 50, and project upwardly sufficient to extend well through the apertures 29 to a height sufficient to provide adequately exposed grating teeth. The members 20, and 50 are readily nested, or taken apart.

When the saucer-like member 20 is placed upon the saucer-like member 50 for grating, and orange rind, cheese, carrots, or the like are grated upon the exposed projections or teeth 58, the gratings will collect upon the member 20, since the gratings will be of such coarseness as to prevent their passage through the apertures 29 through which the projections 58 extend. When the grating operation is completed, the members 20 and 50 may be inverted over a receptacle to catch the gratings, and while so inverted, the member 50 and its projections may be retracted from the member 20, with the effect of stripping the teeth 58 of any gratings tending to adhere thereto.

The member 50 is thus readily cleared of gratings and substantially cleaned by the stripping operation, requiring little additional cleaning, while the perforate member 20 is readily cleaned, and the gratings dropped or brushed therefrom. The member 20, having no sharp projections does not present the usual difficult cleaning problem, while the member 50 is substantially stripped clean when the members are separated.

When the saucer-like member 20 is employed with the reamer 30, it may be found desirable to place the member 20 over a suitable bowl or pan to directly catch the extracted juice, and if desired, a sieve or strainer may be interposed between the bowl, and the member 20, so that the extracted juice and pulp such as may escape through the apertures 29 and 39 may be further strained to the extent desired. On the other hand, the saucer-like member 20 and reamer 30 may be set upon the grater member 50, with the teeth thereof projecting upward through the apertures 29. When the three parts thus assembled, the member 50 acts as a support base, and is keyed to the perforate saucer by the grater projections so as to prevent relative rotation therebetween. Thus the reaming action, and twisting effect upon the reamer is resisted by the interfit of the collar ridges 42 with the internal grooves 44 of the reamer body, and relative rotation between the saucer-like members 20 and 50 prevented. In this manner the three members cooperate to act as a simple juicer, which is adequate for holding the juice of a lemon or orange. The three part construction facilitates cleaning, and pulp is readily removed from the saucer member 20, by simply separating the member 50 therefrom.

In practice, the reamer, and members 20 and 50 will be provided as a handy kit, to which, if desired may be added a strainer adapted to cooperate beneath the member 20, during the juicing operation.

The various parts may be formed from sheet metal, such as stainless steel or aluminum, or if desired plastics may be employed. It is necessary, however, that the member 50, with its grating projections must be of such material as to resist the grating action and retaining its grating properties over a period of usage.

The member 20 will be of sufficient stiffness to support the downward thrust during juice extraction of fruit being applied to the reamer and when the member 20 is applied to the member 50 to form the grater, such members so assembled may be held steady upon the table surface, by employing the extractor portion as a pressure knob when grasped by one hand.

While a single form of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

I claim:

1. A combined grater and juicer comprising an annular member having an upstanding circular collar centrally thereof adapted to receive a curved hollow conical shell-like reamer, a concave saucer-like annular portion, and a surrounding rim flange, said annular portion having a plurality of perforations of a diameter to receive grater projections, a grater member disposed immediately below said annular member in nesting relation thereto, and having a plurality of grater projections struck upwardly therefrom in alignment with said apertures and projecting therethrough, and a shell-like hollow conical reamer having a generally circular lower section telescopically positioned over said collar, said shell-like reamer having outwardly projecting ribs formed therein extending from the lower edge and substantially to the upper apex end thereof, said ribs being disposed at uniform spaces around the reamer and presenting internal corresponding grooves, and said ribs defining intermediate gore surfaces upon said reamer, said gore surfaces having a plurality of perforations therein, said collar having outwardly extending projections thereon of a radial height, and circumferential spacing to interfit with said reamer grooves, and key said reamer against rotation relative to said annular member.

2. A combined grater and juicer comprising an annular member having an upstanding circular collar centrally thereof adapted to receive a curved hollow conical shell-like reamer, and a concave saucer-like annular portion, said annular portion having a plurality of perforations of a diameter to receive grater projections, a grater member disposed immediately below said annular member in nesting relation, and having a plurality of grater projections struck upwardly therefrom in alignment with said apertures and projecting therethrough, and a shell-like hollow perforate conical reamer having a generally circular lower section telescopically positioned over said collar, and means coacting between said collar and reamer to key said reamer against rotation relative to said annular member.

References Cited in the file of this patent

UNITED STATES PATENTS

| | | |
|---|---|---|
| 230,679 | Toffler | Aug. 3, 1880 |
| 562,372 | Bouton | June 23, 1896 |
| 587,903 | Wines | Aug. 10, 1897 |
| 611,447 | Curry | Sept. 27, 1898 |
| 1,941,164 | Ciampa | Dec. 26, 1933 |

FOREIGN PATENTS

| | | |
|---|---|---|
| 10,956 | Great Britain | of 1897 |
| 334,196 | Germany | Mar. 11, 1921 |
| 609,991 | Great Britain | Oct. 8, 1948 |